United States Patent [19]

Thorsrud

[11] Patent Number: 4,743,497

[45] Date of Patent: May 10, 1988

[54] LAMINATED PUNCTURE SEALING COMPOSITE AND PREPARATION THEREOF

[75] Inventor: Agmund K. Thorsrud, Bartlesville, Okla.

[73] Assignee: Phillips Petroleum Company, Bartlesville, Okla.

[21] Appl. No.: 913,295

[22] Filed: Sep. 30, 1986

Related U.S. Application Data

[63] Continuation of Ser. No. 763,726, Aug. 8, 1985, abandoned.

[51] Int. Cl.$^4$ .................. B32B 11/10; B32B 25/10; B60C 21/08; B60C 21/14
[52] U.S. Cl. ...................... 428/286; 152/502; 152/503; 152/504; 152/DIG. 16; 156/115; 156/123; 156/308.2; 156/308.6; 523/166; 524/68; 524/71; 428/284; 428/911
[58] Field of Search ............. 156/307.1, 123, 115, 156/307.3, 308.2; 152/DIG. 16; 523/166; 428/284, 286, 911; 524/71, 68

[56] References Cited

U.S. PATENT DOCUMENTS

| | | | |
|---|---|---|---|
| 2,699,811 | 1/1955 | Trautman | 152/364 |
| 2,752,979 | 6/1956 | Knill et al. | 152/347 |
| 2,811,190 | 10/1957 | Iknayan et al. | 152/347 |
| 2,833,327 | 5/1958 | Boyle | 156/97 |
| 2,852,058 | 9/1958 | Chambers et al. | 156/97 |
| 2,935,109 | 5/1960 | Railsback | 152/347 |
| 3,474,625 | 5/1967 | Draper et al. | 61/1 |
| 3,611,888 | 12/1969 | Kavalla | 94/18 |
| 3,726,741 | 4/1973 | Middlebrook | 156/334 |
| 3,779,964 | 12/1973 | Gagle et al. | 260/28.5 AS |
| 3,856,732 | 12/1974 | Bresson et al. | 524/68 |
| 3,864,157 | 2/1975 | Bresson et al. | 117/138.8 E |
| 3,900,102 | 8/1975 | Hurst | 206/411 |
| 3,903,947 | 9/1975 | Emerson | 428/912 |
| 3,953,974 | 5/1976 | Bresson et al. | 61/1 R |
| 3,981,342 | 9/1976 | Farber et al. | 152/347 |
| 4,057,090 | 11/1977 | Hoshikawa et al. | 152/347 |
| 4,115,335 | 9/1978 | Reusser et al. | 260/28.5 AS |
| 4,129,541 | 12/1978 | Marrs et al. | 260/28.5 AS |
| 4,158,371 | 6/1979 | Reusser et al. | 138/145 |
| 4,171,237 | 10/1979 | Bohm et al. | 156/115 |
| 4,196,115 | 4/1980 | Bresson | 260/28.5 B |
| 4,217,259 | 8/1980 | Bresson | 260/28.5 AS |
| 4,418,167 | 11/1983 | Bohm et al. | 524/68 |
| 4,430,465 | 2/1984 | Abbott | 524/64 |
| 4,540,035 | 9/1985 | Roberts | 156/97 |

FOREIGN PATENT DOCUMENTS 2045793 2/1980 United Kingdom .

OTHER PUBLICATIONS

Rubber Developments, vol. 33, No. 1, 1980, pp. 22–23.

*Primary Examiner*—Allan M. Lieberman
*Attorney, Agent, or Firm*—A. W. Umphlett

[57] ABSTRACT

A composition useful in sealing punctured tires that includes asphalt, alkadiene-vinylarene copolymer, hydrocarbon resin and other materials. The composition is simple to install and lightweight.

14 Claims, No Drawings

LAMINATED PUNCTURE SEALING COMPOSITE AND PREPARATION THEREOF

This application is a continuation of application Ser. No. 763,726, filed 8/8/85, now abandoned.

BACKGROUND OF THE INVENTION

This invention relates to a puncture sealing composition. It also relates to a puncture sealing composition useful in preventing tires from going flat.

Puncture sealing tubeless tires are known in the art. Most of the tires previously proposed contain, in the area of the tire, called the undertread or the area extending across the crown of the tire from one shoulder to the other, a layer of sealant composition. This composition generally has plastic and adhesive qualities such that the composition tends to stick to a puncturing object and when the puncturing object is withdrawn it tends to flow into the opening or puncture, forming a plug which seals the opening against loss of air from the tires. Unfortunately it has proven difficult to provide a composition which would flow into the puncture hole and yet have sufficient viscosity to prevent it from flowing at elevated temperatures, which may go up to 250° F. in an automobile pneumatic tire under operating conditions. The problem is complicated by the extreme centrifugal force to which the composition is subjected as the tire rotates at high speed, since such centrifugal force tends to cause the composition to flow into the central crown area leaving the area near the shoulders unprotected. Furthermore it has proven difficult to provide a sealant composition which would retain the desired balance of viscosity, plasticity, adhesion and conformability over an extended period of service.

It is therefore an object of this invention to provide a puncture sealing composition which has the ability to seal against puncturing objects on the tire. Another object of this invention is to provide a puncture sealing composition that is useful over a wide range of temperatures. It is another object of this invention to provide a puncture sealing composition that provides uniform protection across the crown of the tire. Other objects of this invention will become apparent from the following disclosure.

SUMMARY OF THE INVENTION

According to this invention a puncture sealant for pneumatic tires is provided comprising asphalt, a alkadiene-vinylarene copolymer, petroleum hydrocarbon resin and optionally extender oil, silica or filler. In a preferred embodiment the above asphalt rubber composition is laminated to a non-woven polypropylene fabric. The preferred composition is inherently adhesive so that it will adhere to the tire. In an optional embodiment, a pressure sensitive adhesive can be applied to the composition. Strips of the laminate are applied to the inside of the tire to prevent loss of air when punctured.

This invention provides a simple low cost method for making regular pneumatic tires and the like puncture resistant by bonding a pressure sensitive self-sealing composition in strip form onto the interior circumference of the tire carcass. It also provides a self-sealing composition that can be adjusted for processing properties, low and high temperature resistance, pressure sensitive adhesion properties, specific gravity and self-sealing characteristics by choice of polymers, plasticizers, resins and fillers. The self-sealing compositions are based on selected asphalts modified for flow and temperature resistance by block polymers, or on thermoplastic block polymers dissolved in plasticizers, instead of the conventional self-sealing compositions which have to be vulcanized, and normally have relatively high specific gravity. These compounds will, therefore, have advantages both in weight and fuel consumption.

DETAILED DESCRIPTION OF THE INVENTION

The asphalt employed in this invention can be any of the well known bituminous substances derived from a number of materials such as, for example, petroleum, shale oil, coal tar and the like. Asphalt is a thick, viscous mixture of compounds such as, for example, paraffinic, cycloaliphatic and aromatic hydrocarbons and lesser amounts of heterocyclic compounds containing sulfur, nitrogen, or oxygen. Although asphalt can be obtained from natural sources it is primarily derived as the residue of petroleum distillation (e.g. the bottom product of a vacuum distillation of a topped crude). Although this invention is not limited thereto, it is presently preferred that the asphalt have a penetration (ASTM D5) at 77° C. ranging from about 50 to about 250 and more preferably from about 110 to about 130.

The alkadiene-vinylarene copolymers suitable for use in this invention are derived from alkadiene monomers and vinyl-substituted aromatic monomers. The copolymers can be linear or branched. They can be random copolymers or block copolymers. At the option of the practitioner the copolymer can be partially or substantially hydrogenated. Thermoplastic block copolymers are presently preferred.

Suitable alkadiene monomers used to produce the alkadiene-vinylarene copolymers are the unsaturated hydrocarbons containing at least two double bonds. The alkadiene monomers can be straight-chained (e.g. 1,3-butadiene) or cyclic (e.g. cyclopentadiene) but straight-chained is preferred. It is also preferred that the alkadiene monomer be conjugated (e.g. 1,3-butadiene) as opposed to unconjugated (e.g. 1,2-butadiene). Although the alkadiene monomer can contain any number of carbon atoms it is contemplated that the alkadiene monomer will ordinarily in the practice of this invention contain from 4 to 12 carbon atoms. Those containing from 4 to 8 carbon atoms are especially preferred. Examples of suitable alkadiene monomers include 1,3-butadiene, isoprene, 2,3-dimethyl-1,3-butadiene, piperylene, phenyl-1,3-butadiene, 1,3-pentadiene, 2-ethyl-1,3-pentadiene, 1,3-hexadiene, 2-methyl-1,3-undecadiene, 2-methyl-3-isopropyl-1,3-butadiene, and the like.

Suitable vinylarene monomers used to produce the alkadiene-vinylarene copolymers are the vinyl-substituted aromatic hydrocarbons which can include a single aromatic ring or more than one aromatic ring. Monovinyl-substituted aromatic hydrocarbons containing any number of carbon atoms can be employed but those containing from 8 to 18 carbon atoms are preferred. Exemplary vinylarene monomers include styrene, 3,5-diethylstyrene, 4-n-propylstyrene, 4-cyclohexylstyrene, 4-phenylstyrene, 4-methoxystyrene, 3-pentoxystyrene, 2,4,6-trimethyl-styrene, 4-decylstyrene, 1-vinylnaphthalene, 8-phenyl-1-vinylnaphthalene, 3-benzylstyrene, and the like.

The preparation of alkadiene-vinylarene copolymers is well known in the art. The reader is invited to examine U.S. Pat. Nos. 3,281,383 and 3,639,521, incorporated by reference herein, for a more detailed discussion.

1,3-butadiene-styrene and isoprene-styrene copolymers are presently preferred. Linear block and radial teleblock 1,3-butadiene-styrene copolymers containing from about 10 to about 50 weight percent of bound styrene are the most preferred.

The inventive composition need not be limited to a single alkadiene-vinylarene copolymer but rather can include two or more of the above-described copolymers. The preferred embodiment of this invention includes a 1:2 weight ratio mixture of Solprene ®411 and Solprene ®1205. Solprene ®411 is a radial teleblock 1,3-butadiene-styrene copolymer with a bound styrene content of about 30 weight percent, a number average molecular weight Mn of about 220,000 and a vinyl content (1,2 addition mode) of about 11 percent. Solprene ®1205 is a linear 1,3-butadiene-styrene copolymer with a bound styrene content of about 25 weight percent (of which about 18 weight percent is present as a polystyrene block), a number average molecular weight Mn of about 65,000 to 70,000, and a vinyl content of about 9 percent. The above number average molecular weights were determined from gel permeation chromatography curves by a procedure described by G. Kraus and C. J. Stacy, J. Poly. Sci., A-2, 10, 657 (1972) and J. Poly. Sci. Symposium No. 43, 329 (1973) using tetrahydrofuran as the solvent.

Suitable petroleum hydrocarbon resins include the unsaturated synthetic polymeric products derived from variable mixtures of unsaturated monomers obtained as volatile by-products in the cracking of natural gas, gas oil or petroleum naphthas. These unsaturated monomers can be, for example, olefins (such as pentenes, hexenes and heptenes), diolefins (such as pentadienes and hexadienes), cyclic olefins (such as cyclopentene and cyclohexene), cyclic diolefins (such as cyclopentadiene, methylcyclopentadiene and cyclohexadienes), cyclic diolefin dimers (such as dicyclopentadiene and methylcyclopentadiene dimer), and vinyl aromatic hydrocarbons (such as styrene, α-methylstyrene, vinyltoluenes, indene and methylindenes). These mixed unsaturated monomers undergo addition-type polymerization by cationic initiation to form petroleum hydrocarbon resins. These petroleum hydrocarbon resins, which can range from brittle solids to viscous liquids, are generally lower in molecular weight than polyethylene, polypropylene, polybutadiene, polystyrene and the like. A more detailed description of suitable petroleum hydrocarbon resins can be found in The Encyclopedia of Polymer Science and Technology, Volume 9, 1968, John Wiley and Sons, pages 853-860, incorporated by reference herein.

The presently preferred petroleum hydrocarbon resins are those prepared by polymerization of diolefin fractions and aromatic petroleum fractions. The presently most preferred petroleum hydrocarbon resin is derived from piperylene (1,3-pentadiene) and indene monomers. An example of such a resin, marketed as Escorez ®2101 by Exxon Chemical Americas, Houston, Tex., has a specific gravity at 20° C. of about 1.02(ASTM D71), Ring and Ball softening point of about 90°-96° C. (ASTM E28), a melt viscosity of about 300 cP at 160° C. (ASTM D3236), a number average molecular weight Mn of about 525 and a weight average molecular weight Mn of about 925 according to an Escorez ®2101 Bulletin, Reference 97618, issued June 1980 by Exxon Chemical Americas.

Lower molecular weight or softening point resins were found to improve the low temperature properties of the inventive compound. Although no evaluation was done to find optimum results, resins such as Piccovar ®AP-25, Piccolyte ®A-10 and Piccomer ®25 made by Hercules Inc., Wilmington, DE, gave acceptable results. Generally, resins produced from petroleum derived aromatic monomers, polyterpene resins derived from alpha-pinene and resins made from Petroleum and coal derived aromatic monomers can all be used in this embodiment of the compounds of the instant invention.

This invention can also incorporate silica. Either ground or hollow silica spheres can be used within the process of this invention. Preferably fumed silica will be used as it lessens the creep tendencies of the composition. This material can be present in amounts ranging from 0 to about 100 but in particular the fumed silica will be present from 5 to 30 parts of the composition.

The compositions of this invention can optionally contain mineral fillers such as, for example, silicates, carbonates, or mineral aggregates (e.g. sand, chat, screened pebbles or rock). The fillers help control viscosity, reduce cost, improve durability and facilitate the coating of the composition onto the fabric. The preferred filler is ground sand having a particle size of about 300-350 mesh.

The compositions of this invention can also contain an extender oil, preferably a naphthenic or aromatic hydrocarbon oil having a specific gravity of about 0.89-1.05, such as Sundex 890 marketed by Sun Oil Company. The extender oil improves the wetability (i.e. reduces viscosity) of the compositions thereby creating better contact with the substrate and improving adhesion thereto.

Additional beneficial effect can of course be obtained by using resins and/or oil with better thermal stability.

For instance, Sundex 8125 will have 50-70% higher viscosity than Sundex 790 at tire running temperatures. Also, Escorez Resins 2101 can be replaced by Escorez Resin 1310 which has about the same softening point (91°-97° C. vs. 90°-96° C.) but has considerably higher melt viscosity (700 cP vs. 300 cP at 160° C.). For colder climates, naphthenic oils such as Circosol 4240 are preferred.

In addition, the compositions of the invention can and generally should contain one or more antidegradants such as antioxidants or antiozonants or an extreme pressure agent with antioxidant characteristics such as lead dialkyldithiocarbamate. The preferred antioxidants are marketed as Vanlube ®71 and Ageright Stalite ®.

An important feature of the sealant liner is that it stays in place even at the high running temperatures of a tire. This feature can be influenced by:
  (a) adding more Solprene ®411. However, too much of this polymer will increase the viscosity of the melt and make the preferred processing more difficult.
  (b) adding to the sealant compound 5-20% fibers (⅛"-1" length) of a material with higher melting point than 300° F. Cotton fibers are preferred. However, such fibers will also interfere with the viscosity and complicate processing.
  (c) increasing heat resistance by adding 10-40% Cumaron LX 509 resin.
  (d) laminating the sealant liner with a non-woven fabric (for instance Duon ® non-woven polypropylene fibers) of sufficient weight to prevent penetration of the compound and resulting sticking to the calender roll. This non-woven fabric has proven very effective and sufficient in preventing displacement of the sealant liner at running temperatures. The non-woven fabric can either preferably be on one side only (like in Phillips Fibers' Petromat ®) or embedded inside if the product is made by spreading.

The relative amounts of each component should generally fall within the appropriate range given in Table I. The scope of this invention, however, is not limited to the ranges recited therein. The ranges are given in terms of parts by weight per 100 parts by weight of asphalt.

TABLE I

| Parts by weight per 100 parts asphalt: | Suggested | Intermediate | Preferred |
|---|---|---|---|
| Asphalt | 100 | 100 | 100 |
| Alkadiene—Vinylarene Copolymer | 5-50 | 15-40 | 25-35 |
| Petroleum Hydrocarbon Resin | 1-30 | 5-20 | 12-18 |
| Extender Oil | 0-75 | 15-35 | 20-30 |
| Silica and/or Fumed Silica | 0-100 | 0-50 | 5-30 |
| Antidegradant | 0-2 | 0.1-1.5 | 0.2-1.0 |

The composition can be made in any conventional manner. The examples following provide a particular process found suitable for making the sealing composition.

Once the sealing composition has been made it is calendered or extruded onto a non-woven fabric. This material helps prevent displacement of the sealant compound at running tire temperatures. This non-woven fabric can be any polyolefin material known in the art. A particularily useful non-woven fabric includes polypropylene materials such as DUON ®. Non-woven fabric will be calendered with the sealing compound creating the tire sealing strip.

A silicone release paper can also be used to protect the sealant compound and to retain the stickiness of the compound. Therefore in this embodiment a sandwich is formed comprising release paper, sealant composition and non-woven fabric.

The thus formed sandwich can then be placed on the tire by removing the silicone release paper and pressing the sealant composition on to the cleaned intercarcass of the tire along the inside of the crown.

Besides the prevention of displacement of the sealant compound at running tire temperatures by laminating the sealant compound with a non-woven fabric, this idea permits rendering regular tires puncture proof by subsequently applying the self-sealing liner after the tires have been manufactured. This will save costs, complications, rejects and inventories for the tire suppliers. The invented puncture proofing system can easily be applied by the tire producer after manufacture, by the tire dealer or by the consumer. The area inside the tire which needs to be made puncture proof or even sidewalls in off-the-road tires, can be made self-sealant as desired.

The self-sealing liner is attached to the inside of the tire *after* manufacturing of the tire. It can be easily done as a do-it-yourself job by the tire dealer or the vehicle owner. To my knowledge, so far all successful self-sealing liners are permanently attached to the inside crown of the tires during manufacturing. This means an additional product line. Also production of such tires is more costly and delicate, and the slightest displacement of the sealant will result in rejection because of imbalance.

Bonding to the inside crown of the tire is accomplished by the pressure sensitive adhesion characteristics of the sealant itself after thoroughly cleaning of the interior tire surface. Heat is not needed. However, heating of the tire is beneficial in smoothing out the sealant liner along the edges. Any tendency to imbalance can immediately be corrected.

The preferred method of applying the sealant strips involves:

(a) cleaning the inside of tire carcass with a solvent (for example hexane);

(b) removing about four inches of release paper from one end of the puncture sealant strip, and attaching it under the crown on the inside of the tire;

(c) removing release paper as you go and pressing the strip firmly around the whole internal circumference of the tire;

(d) cutting off excessive length so the end of the strip touches the beginning and, (e) firmly pressing (or rolling) the whole surface of the strip to obtain maximum adhesion and avoid trapped air. If blisters with trapped air are evident, they can be eliminated by puncturing with a needle, nail, etc.

The pressure sensitive adhesion can be achieved by providing a pressure sensitive adhesive coating on one side (under the release paper), but a more elegant and less costly method is to build these characteristics into the sealant compound.

More specific details of this invention are described in the following examples.

EXAMPLE I

The following is an example of how the instant composition is made.

Half of the asphalt and all Solprene 411 are mixed at about 300° F. After dissolution of Solprene 411, the remainder of asphalt is added together with oil, Solprene 1205C and resin. After dissolution of Solprene 1205 and resin, silica or hollow silica spheres is added if needed. The hot viscous material (about 40000 cp for formulation A at 280° F.) is fed into a calender and is rolled between Duon ® and release paper. The combination is rolled up with release paper being the outer side.

This wide roll is then passed through slitting equipment and rolled up in about 6" wide rolls, always with release paper as outer side.

The equipment useful in this invention include; (1) asphalt mixer, preferably high shear, although low shear ribbon blender type can also be used, (2) horizontal two-roll calender with facilities for feeding release paper over one roll and Duon ® over the other roll, (3) equipment for subsequent slitting.

The following is a list of typical formulations useful in this invention.

TABLE II

| Parts by weight per 100 parts asphalt | A | B | C | D |
|---|---|---|---|---|
| Asphalt Pen 120/140 | 100 | 100 | 100 | — |
| Solprene 411S | 10 | 20 | 50 | 100 |
| Solprene 1205C | 20 | 20 | 20 | — |
| Circosol 4240 Naphthenic Oil | — | — | 50 | 150 |
| Sundex 790 Aromatic Oil | 25 | 25 | 25 | 25 |
| Escorez Resin 2101 | 10 | 10 | 10 | 20 |
| Silica Filler (or hollow silica spheres) | 30 | — | — | — |
| | 195 | 175 | 205 | 320 |
| Calculated Specific Gravity | 1.05 | 0.96 | 0.95 | 0.95 |
| Calculated sp. gr. with 30 phr | 0.91 | 0.91 | 0.91 | 0.92 |

TABLE II-continued

| Parts by weight per 100 parts asphalt | A | B | C | D |
|---|---|---|---|---|
| hollow silica spheres | | | | |

Other Materials
(1) Non-woven polypropylene fabric Duon® from Phillips Fibers, Greenville, SC, 4½ oz. for above formulation A and B, 3½ oz. for formulation C.
(2) Silicone release paper from H. P. Smith, Chicago, Il.

The specific gravity can be further reduced by adding hollow sphere silica fibers like Fillite (sp. gr. 0.7) from Fillite USA, Inc., Huntington, W. Va., or Extendospheres (sp. gr. 0.7) from Tac Industries, Inc., Dalton, Ga.

EXAMPLE II

Some strips of pressure sensitive adhesive coated Petromat® made at Mineral Fibers Manufacturing, Coshocton, Ohio, were calandered with the following base asphalt formulation:

| | |
|---|---|
| Asphalt (Pen 120/140) | 100 |
| Solprene ® 411S | 10 |
| Solprene 1205C | 20 |
| Sundex 790 (Arom. oil) | 25 |
| Escorez Resin 2101 | 10 |
| Silica Filler | 30 |
| Specific gravity ± 1.07 | |

These 6" wide strips were applied to tires as described previously. In September these tires were punctured in several places around the tread and upper sidewall with 6-penny nails both before and after running several hundred miles (running temperature inside: 140° F., outside: 110° F.). The tires were checked before and after running and showed absolutely no leakage of air.

After 5 months storage at warehouse temperature, the tires were checked again. Again there was no leakage of air. However, in these 5 months the pressure at September temperatures of 28 psi was now at below freezing temperatures reduced to 24 psi which is normal for any non-punctured tires. The air pressure was again measured in June, 10 months after the road test, and was 25 psi, i.e., at least as good as for a non-punctured tire.

EXAMPLE III

This example demonstrates that adding a fumed silica like Cab-O-Sil greatly improves the heat softening resistance without significantly detracting from the self-sealing properties of the compound or its low specific gravity.

The Solprene ®/asphalt compound used in Example II was used as a base. The heat-softening resistance test was done at 150° with a 3 oz. weight and a ⅜" diameter foot (modified ASTM-621).

The results were as follows:

| | % Deflection @ 20 minutes |
|---|---|
| Control | 84 |
| 10% Cab-O-Sil added | 50 |
| 20% Cab-O-Sil added | 10 |
| 30% Cab-O-Sil added | 0 |

Therefore, the addition of minimum 10% fumed silica is sufficient for adequate heat softening resistance. Addition of more than 20% Cab-O-Sil will start to dry out the compound enough that it might interfere with the self-sealing properties.

The following table shows typical formulations utilizing fumed silica.

TABLE III

| Parts by weight per 100 parts asphalt | A | B | C | D |
|---|---|---|---|---|
| Asphalt Pen 120/140 | 100 | 100 | 100 | — |
| Solprene 411S | 10 | 20 | 50 | 100 |
| Solprene 1205C | 20 | 20 | 20 | — |
| Circosol 4240 Naphthenic Oil | — | — | 50 | 150 |
| Sundex 790 Aromatic Oil | 25 | 25 | 25 | 50 |
| Escorez Resin 2101 | 10 | 10 | 10 | 20 |
| Silica Filler | 30–0 | — | — | — |
| Fumed Silica (Cab-O-Sil) | 5–30 | 5–30 | 5–30 | 5–30 |
| | 175–225 | 180–205 | 210–235 | 325–350 |
| Calculated Specific Gravity | 1.06–1.13 | 0.98–105 | 0.96–1.03 | 0.96–1.03 |

All compounds have been shown to have adequate self-sealing properties even at ambient temperatures.

The ground silica filler was added not only for reduced cost but also to increase the specific gravity. Everything considered (cost, processing, specific gravity, performance and present Solprene availability in USA) compound B with 15–20% fumed silica is preferred for temperate or hot climates.

For colder climates, the following compounds are recommended.

TABLE IV

| Parts by weight per 100 parts asphalt | A | B | C | D | E |
|---|---|---|---|---|---|
| Asphalt Pen 120/140 | 100 | 100 | 100 | 100 | 100 |
| Solprene 411S | 12 | — | — | 12 | 12 |
| Solprene 475S | — | 18 | 18 | — | — |
| Solprene 1205C | 24 | 24 | 24 | 24 | 24 |
| Circosol 4240 | 26 | 20 | 26 | 26 | 26 |
| Piccovar AP-25 | 15 | 15 | 15 | — | — |
| Piccolyte A-10 | — | — | — | 15 | — |
| Piccomer 25 | — | — | — | — | 15 |
| Cab-O-Sil EH-5 | 15 | 15 | 15 | 15 | 15 |
| Adhesion to penetrating nail | | | | | |
| at 32° F. | Fair+ | Fair+ | Good | Good | Good |
| at 0° F. | Fair− | Fair− | Fair+ | Fair | Fair |
| Heat deflection @ 150° F.* 20 min., ⅜" diam. foot, Load 3 oz. | | | | | |
| % | 6 | 8 | 10 | 6 | 6 |

*Modified ASTM-621

The use of lower molecular weight and lower softening point resins, coupled with the use of a naphthenic oil such as Circosol 4240 provide a sealing compound useful in low temperature conditions.

I claim:
1. A laminate comprising:
   (a) a first stratum of non-woven fabric adhered to
   (b) a second stratum of sealing composition comprising:
      (1) asphalt,
      (2) an alkadiene-vinylarene copolymer present in an amount in the range of about 5 to about 50 parts by weight per 100 parts of asphalt,
      (3) a hydrocarbon resin present in an amount in the range of about 1 to about 30 parts by weight per 100 parts of asphalt, and
      (4) silica present in a range of about zero to about 100 parts by weight per 100 parts of asphalt, said second stratum pressure adhered to

(c) the inside of a tire carcass.

2. A laminate according to claim 1 where said asphalt has a penetration (ASTM D5) at 77° C. ranging from about 50 to about 250.

3. A laminate according to claim 2 where said asphalt has a penetration (ASTM D5) at 77° C. ranging from about 110 to about 130.

4. A laminate according to claim 1 where said alkadiene-vinylarene copolymer is derived from an alkadiene monomer chosen from unsaturated hydrobarbons with at least two double bonds containing from about 4 to about 12 carbon atoms and a vinylarene monomer chosen from vinyl substituted aromatic hydrocarbons containing about 8 to about 18 carbon atoms.

5. A laminate according to claim 4 where said alkadiene monomer is chosen from 1,3-dutadiene and isoprene and said vinylarene monomer is styrene.

6. A laminate according to claim 5 where said alkadiene-vinylarene copolymer is chosen from linear block and radial teleblock 1,3-butadiene styrene containing from about 10 to about 50 weight percent of bound styrene.

7. A laminate according to claim 1 where said hydrocarbon resin is an unsaturated synthetic polymeric product derived from an addition-type polymerization of a mixture of unsaturated monomers selected from olefins, diolefins, cyclic olefins, dimers or vinyl aromatic hydrocarbons.

8. A laminate according to claim 7 where said hydrocarbon resin is chosen from polymeric products derived from mixtures of diolefin fractions and aromatic petroleum fractions.

9. A laminate according to claim 1 where said silica is selected from ground hollow sphere or fumed silica.

10. A laminate according to claim 1 where said alkadiene-vinyl arylene copolymer is present in the amount ranging from about 25 to about 35 parts by weight per 100 parts of asphalt, said silica is present in an amount ranging from about 5 to about 30 parts by weight per 100 parts of asphalt, and said hydrocarbon resin is present from about 8 to about 12 parts by weight per 100 parts of asphalt.

11. A laminate according to claim 1 where said extender oil is selected from a naphthenic or aromatic hydrocarbon oil and is present in an amount ranging from about 20 to about 30 parts by weight per 100 parts of asphalt.

12. A laminate according to claim 1 wherein said sealing composition also comprises at least one of extender oil, filler, and antidegradent.

13. A process for sealing a tire from punctures comprising adhering to the inside of said tire along the crown of said tire a strip of material consisting of (1) a layer of non-woven fabric and (2) a layer of a composition comprising:
(a) asphalt,
(b) an alkadiene-vinylarene copolymer present in the amount ranging from about 5 to about 50 parts by weight per 100 parts of asphalt,
(c) a hydrocarbon resin present in an amount ranging from about 0 to about 30 parts by weight per 100 parts of asphalt,
(d) silica present in an amount ranging from about 0 to about 100 parts by weight per 100 parts of asphalt wherein said composition is placed next to said tire.

14. A process according to claim 13 wherein said composition also comprises at least one of extender oil, filler, and antidegradent.

* * * * *